(12) United States Patent
Lubiner

(10) Patent No.: US 11,915,606 B2
(45) Date of Patent: Feb. 27, 2024

(54) TACTILE AND VISUAL DISPLAY WITH A PAIRED, ACTIVE STYLUS

(71) Applicant: Daniel Seth Lubiner, Valhalla, NY (US)

(72) Inventor: Daniel Seth Lubiner, Valhalla, NY (US)

(*) Notice: Subject to any disclaimer, the term of this patent is extended or adjusted under 35 U.S.C. 154(b) by 1290 days.

(21) Appl. No.: 16/260,093

(22) Filed: Jan. 28, 2019

(65) Prior Publication Data

US 2020/0242969 A1    Jul. 30, 2020
US 2022/0139257 A9    May 5, 2022

Related U.S. Application Data

(60) Provisional application No. 62/622,947, filed on Jan. 28, 2018.

(51) Int. Cl.
```
G09B 21/00    (2006.01)
G09F 9/305    (2006.01)
G09F 9/37     (2006.01)
G09B 21/02    (2006.01)
G06F 3/01     (2006.01)
```

(52) U.S. Cl.
CPC ........... *G09B 21/004* (2013.01); *G06F 3/016* (2013.01); *G09B 21/002* (2013.01); *G09B 21/025* (2013.01); *G09F 9/305* (2013.01); *G09F 9/372* (2013.01)

(58) Field of Classification Search
None
See application file for complete search history.

(56) References Cited

U.S. PATENT DOCUMENTS

| | | | | |
|---|---|---|---|---|
| 5,842,867 A | * | 12/1998 | Hong | G09B 21/004 434/114 |
| 6,636,202 B2 | * | 10/2003 | Ishmael, Jr. | G06F 3/016 434/114 |
| 7,097,457 B2 | * | 8/2006 | Kajino | G09B 21/004 434/112 |

(Continued)

FOREIGN PATENT DOCUMENTS

EP        1 429 307 A1    6/2004

*Primary Examiner* — Sunit Pandya
(74) *Attorney, Agent, or Firm* — Morris Law Group; Robert W. Morris

(57) ABSTRACT

An active, specialized stylus and sharp color graphics may be combined with a tactile display in order to increase accessibility to the blind and visually impaired. A tactile display may consist of an array of pins that may be raised to varying heights to represent contours and outlines of images that are recognizable when touched. A specialized stylus may allow the user to instantly create, touch and save tactile drawings or alter with multi-sensory feedback.

A tactile and visual display may consist of an array of pins, with circular or squared-off tops. Physical attributes may be given to individual pins, the screen itself (LED), or a LCD WXGA or other type of projector may be incorporated so that enhanced visual imaging is combined with tactile graphics to give those with different levels of visual impairment a multisensory feedback when experiencing images or drawings. Also this technology may be used with autistic students and those with learning disabilities, as well as serve as a means of entertainment.

36 Claims, 9 Drawing Sheets

(56) References Cited

U.S. PATENT DOCUMENTS

| | | | |
|---|---|---|---|
| 8,573,979 B2* | 11/2013 | Skinner | G09B 21/003 434/114 |
| 8,740,618 B2 | 6/2014 | Shaw | |
| 9,105,198 B2* | 8/2015 | Habas | G09B 21/003 |
| 9,142,143 B2* | 9/2015 | Chari | G09B 21/004 |
| 10,163,367 B2 | 12/2018 | Moon et al. | |
| 10,453,359 B2 | 10/2019 | Kim et al. | |
| 11,455,910 B2* | 9/2022 | Bailey | G09B 21/02 |
| 2002/0158836 A1 | 10/2002 | Ishmael, Jr. et al. | |
| 2009/0023116 A1 | 1/2009 | Shaw | |
| 2010/0162109 A1 | 6/2010 | Chatterjee et al. | |
| 2012/0082313 A1 | 4/2012 | Diamant et al. | |
| 2014/0120195 A1* | 5/2014 | Ploskonka | B29C 33/308 425/174 |
| 2015/0125831 A1* | 5/2015 | Chandrashekhar Nair | G09B 21/004 434/114 |
| 2015/0262509 A1* | 9/2015 | Labbe | G09B 21/004 434/113 |
| 2015/0331528 A1 | 11/2015 | Robinson et al. | |
| 2015/0379895 A1* | 12/2015 | Chari | G09B 21/004 434/114 |
| 2016/0034180 A1* | 2/2016 | Labbé | G06F 3/0219 345/173 |
| 2016/0224116 A1* | 8/2016 | Hagedorn | G06F 3/14 |
| 2019/0347961 A1 | 11/2019 | Memon et al. | |
| 2020/0118462 A1* | 4/2020 | Shao | G09B 21/004 |
| 2020/0242969 A1 | 7/2020 | Lubiner | |
| 2021/0134183 A1* | 5/2021 | Moon | G06F 3/0393 |
| 2021/0295739 A1* | 9/2021 | Moon | G09B 21/02 |

* cited by examiner

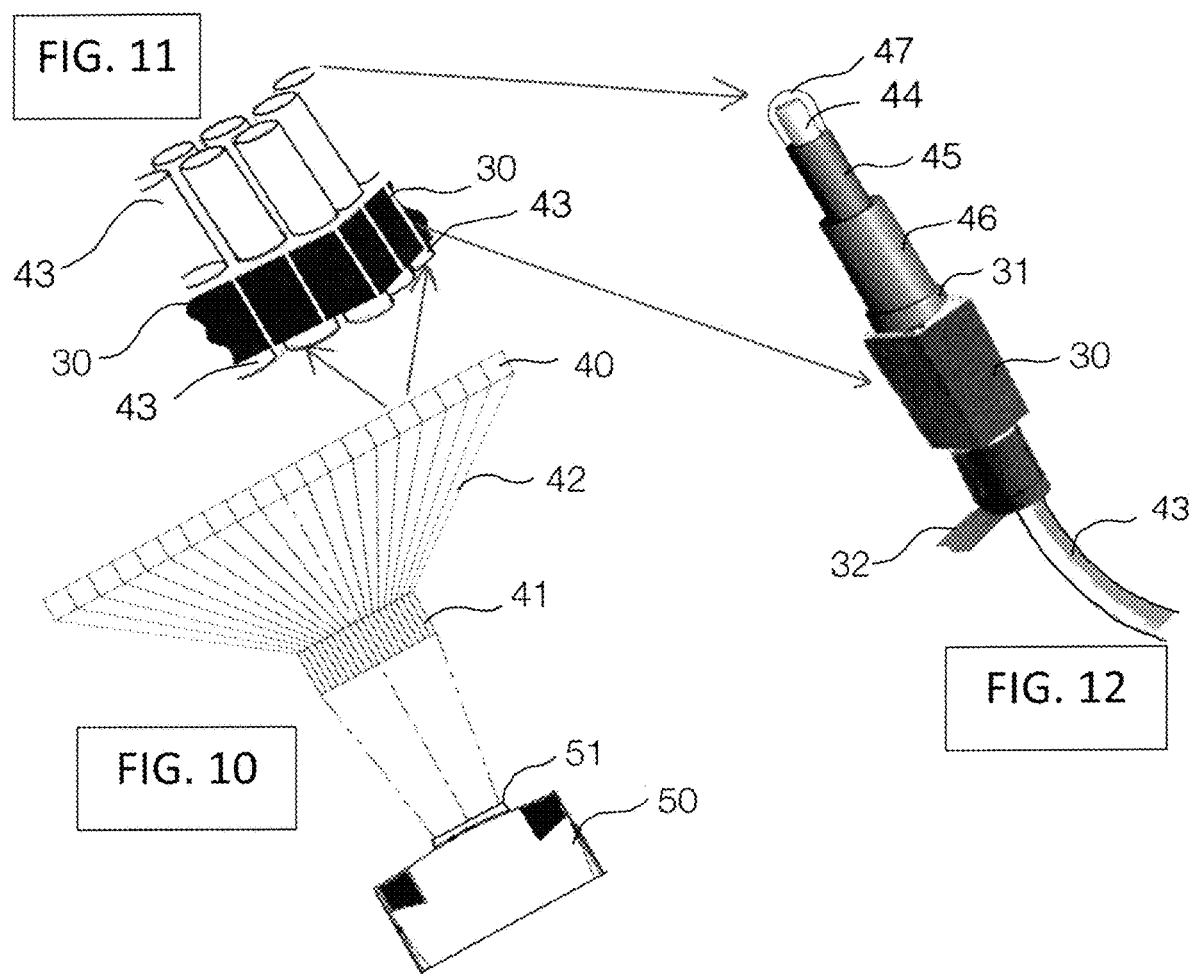

TACTILE AND VISUAL DISPLAY WITH A PAIRED, ACTIVE STYLUS

CROSS-REFERENCE TO RELATED APPLICATION

This application claims priority from provisional Application 62/622,947 filed Jan. 28, 2018, entitled Fiber optic tactile display.

FIELD OF THE INVENTION

Embodiments of this invention relate to devices with tactile displays. More particularly, these displays are both tactile and visual and be manipulated by an active stylus and the methods and means to accomplish these ends.

BACKGROUND INFORMATION

Tactile displays are evolving presently that extend many possibilities for use for the blind and visually impaired. For example, patents now exist that describe a tactile display device comprised of a two-dimensional array of variable height pixels or pins, wherein the height of each pixel in the tactile display is converted from incident light using proportions to the gray scale intensity of an image. Some of these are in the testing phase. Patents US20090130639 A1, U.S. Pat. No. 9,105,198 B2, and U.S. Pat. No. 7,352,356B2 are some of the prior art that are the basis of this invention.

Also, the technology of the active stylus that transmits data to an electronic device has evolved considerably, and the variety is extensive. However, an electronic stylus that is made to be user friendly to a blind or visually impaired person does not exist. With a device like this, a stylus would need to be designed to the task of raising and lowering the pins and changing the colors of said pins. Lastly, there are many features on existing tablet computers that are inaccessible to blind and visually-impaired people.

To another end, the toy Lite Brite gained its popularity by creating a unique way for children to do art that is both tactile and visual. Also, a current trend among millions of artists is Pixel Art. Pixel artists create drawings either 2 dimensionally or 3 dimensionally (on computer) by combining numerous squares or cubes in various colors. This invention may also create a unique tool for artists, young and old.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

FIG. 10 is a view of a projector transmitting visual images to expanding optical fiber FIG. 11 is a close-up view of the display FIG. 12 is a view of the cable structure of a single optical cable with display tip and a device (motor) for causing linear movement.

DETAILED DESCRIPTION

In the following detailed description, well-known methods, procedures, components, and circuits have not been described in detail as not to unnecessarily obscure aspects of the invention. It should be apparent to one skilled in the art that the invention can be practiced without these specific details.

Figure 1:
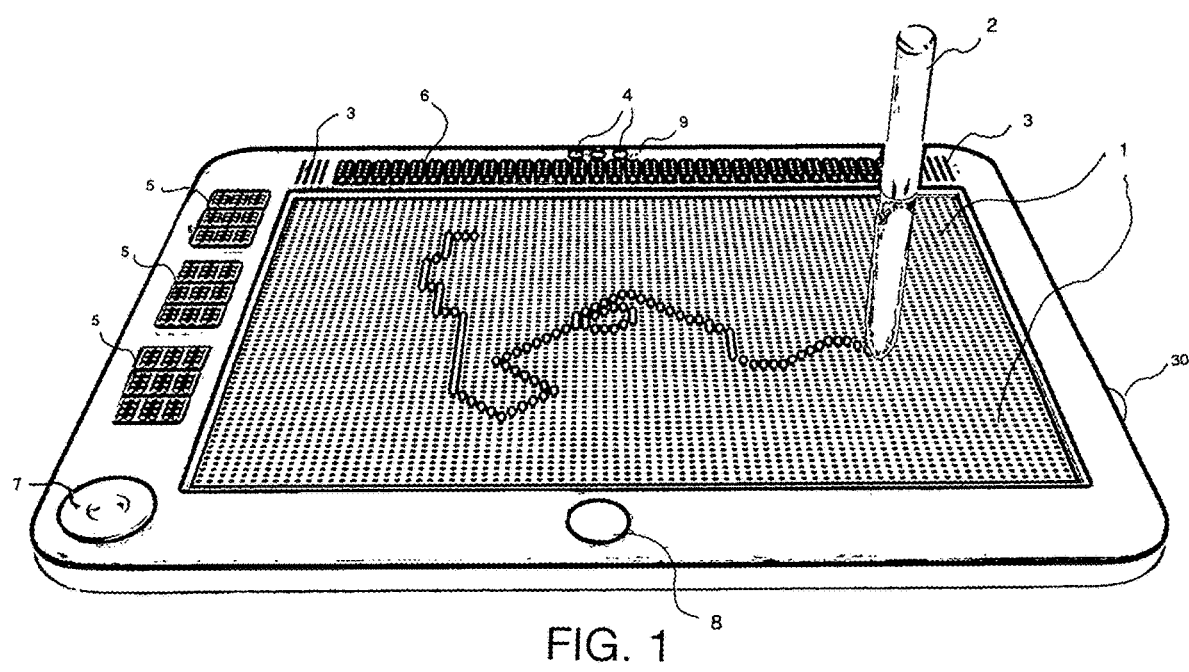
FIG. 1 is a front view of this invention with the active stylus

FIG. 1 shows an example of a construction of a hardware system; a generic computer system, which can be used with a tactile and visual display according to the present invention. The blind and visually impaired are limited in the way they can utilize the current and ever-improving touch-screen devices. Advances have been made in the area of tactile displays, comprised of an array of pins that may be raised in height relative to one another to represent contours and outlines of images and objects when touched. Also, there is the increasing usefulness of haptics technology. However, the technology is in its infancy. There is also a relative dearth of technology attending to the needs of the majority of visually-impaired people who are not completely blind. A refreshing, interactive (multi-touch) tactile display created with hundreds of self-adjusting pins encompassing. Enhanced visual imaging combined with a tactual display 1 offers a rich set of possibilities. In addition to a tactile experience, an apparatus that utilizes clear pins, or uses fiber optics, or LED technology. This would allow the user with limited vision to see their drawings come to life in bright, colorful illuminated illustrations that they can experience in a multi-sensory way.

An active stylus 2 is paired with this invention in the action of drawing (raising pins). Lacking in current thinking is the fact that the blind, whether reading or drawing, use two hands—one to draw and one to feel as they draw. This makes drawing with one finger impossible.

The device may also include the many of the aspects of a tablet or portable computer. With USB, Wi-Fi, wireless network (with SIM card) and Bluetooth connectivity, information and graphics can be 'viewed', saved, shared and sent over the Internet or to another device like a printer.

Incorporating voice-recognition and AI software, like that of 'Siri' in the device will also increase the accessibility of this invention. The user can speak into the microphone, 9 and get feedback through the speaker 3 or through the headphone jack 13 (see FIG. 2) with a means to control volume 30. Pictured also is a "mouse" wheel or "joystick" with push button to scroll and select that may include haptics feedback 7.

The technology included in this invention may also be utilized to become the most user-friendly way for the blind and visually impaired to use the internet.

Multi-lens 3D cameras at the front 4 and the rear 17 (see FIG. 2) and a flashlight 16 (See FIG. 2) of this invention take and create line pictures for the users to "see" what the camera sees. It might also be possible for a user to create a tactile "selfie" with the front-facing camera or send such an image to a different device also opening the door to a tactile 'video chat'. Thirty-two braille display cells with cursor-routing buttons 6 built into the top of the current invention add considerably to its usefulness. Visually-impaired people will be able to read or write captions, commentary, or other verbiage that corresponds to the drawings or images.

The user may use a "mouse" wheel or "joystick" with push select button 7 to scroll, navigate and select items displayed on 1 and it may include haptics feedback. Programmable buttons with refreshable braille cells 5 indicate functions. The functions of the buttons can include, clearing screen, saving, bookmarks, switching programs, 'undo' and more. Buttons with refreshable braille cells 5 to indicate functions have never been utilized before. Above the display is a line of refreshing braille cells 6 for basic reading, writing and for captions (as seen in currently available refreshable braille devices).

Figure 2:
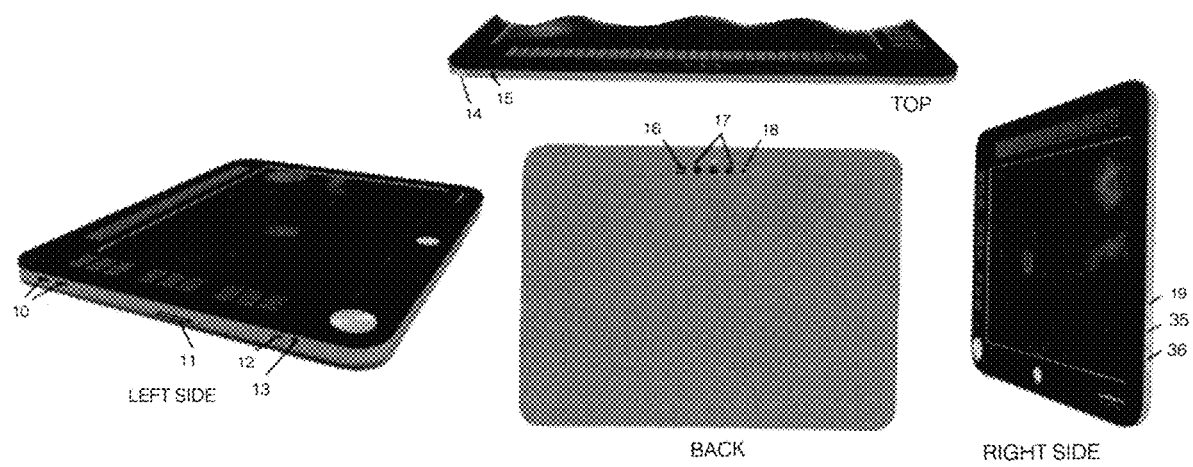
FIG. 2 is a view of the left side, the right side, the back, and the top of the invention

FIG. 2 is a view of the left side, the right side, the back, and the top of the present invention. The rear-facing 3D camera 17 with a LED flash and light 16 and a microphone 18 can take photographs or video of objects in front of the apparatus. Technology is already being developed to incorporate the image of a camera to create a tactile likeness of the landscape in front of a user. It is exciting to think of the impact this technology could have on mobility instruction and navigation for visually impaired and blind people.

A brightness control switch 19 can, like on a cell-phone, increase or decrease the brightness on the visual display. However on this device, the brightness of the display could increase significantly, like twice or three times that of a cell phone display. Some visually impaired people are able the see things better when displays are brightly lit. A brightness switch may allow users to adjust the brightness to a level that works best for them in a simple way. Like the brightness, a contrast control switch 35 and a color saturation control switch 36 could allow users to further customize the visual image to best suit their needs. This feature would also help those with varying degrees of color blindness.

A stylus storage and charging port 14 is a useful addition to this device. The blind and visually impaired could easily store and retrieve the electronically-connected stylus. Also, it will not require a separate action (e.g. plugging it in) to charge it.

The SIM card and memory-card tray 11 may allow the user to expand the memory and allow it to connect, with a SIM card wirelessly to a network for portable internet and phone capabilities. Also pictured are features of the apparatus including a charging/fire-wire port 12, a Headphone jack 13, USB ports 10, and a charging port 15.

Figure 3:
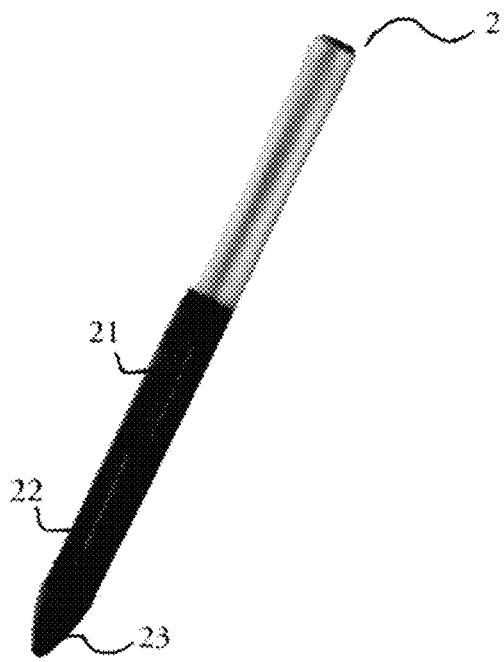
FIG. 3 is view of the active stylus

FIG. 3 shows a representative view of the active and paired stylus 2. The stylus would have means to communicate exact location on the tactile display and other information to the invention. It may also include a means of creating haptic feedback to the user. Lacking in the current field of the invention is an active, electronic stylus made specifically to interface with the interactive tactile/visual display. A stylus 20 programmed and adjustable to raise and lower pins on a tactile display 1 may allow a user to simultaneously 'draw' and feel what is being drawn. The present invention could be useful to an artist with visual disabilities. For example, an artist may press programmable buttons 21 and 22, that have raised indicator bumps, on the stylus to switch from creating curved lines to straight lines, and from rectangles to circles. A button 22 on the stylus may change the input to "eraser mode" to eliminate parts of the drawing. Drawing can then be saved and shared in their digital form allow those with all vision types to view it. A pressure sensitive tip 23 that change the height of the pins in response to the amount of pressure the user places on the stylus.

Figure 4:
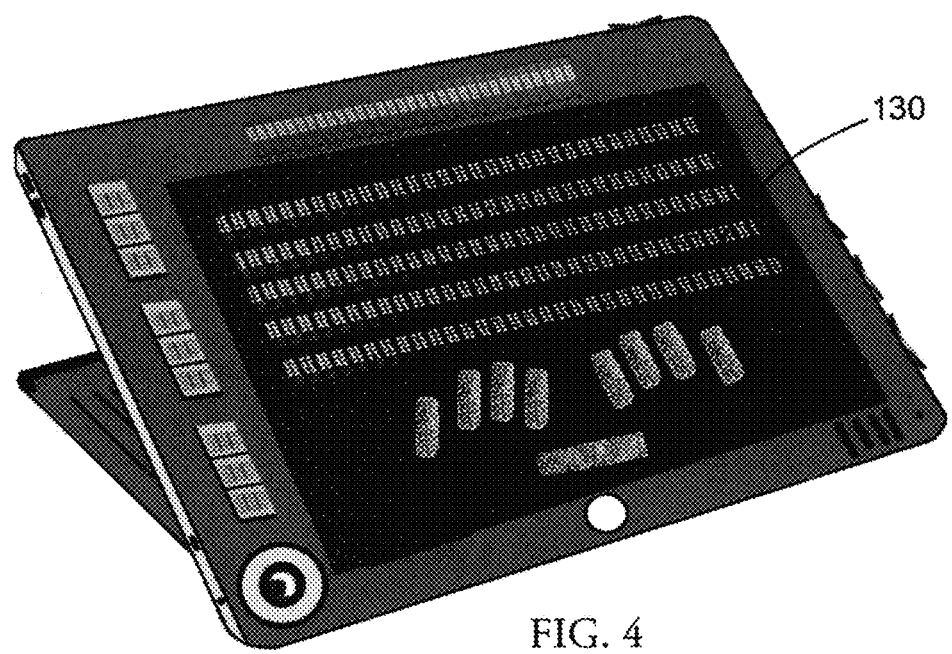
FIG. 4 is a view of this invention serving as a small braille Keyboard with multiple-lines of braille.

FIG. 4 shows a representative view of this invention with a braille keyboard with multiple lines of braille 130 on a tactile display 1 that allows the user more flexibility and usefulness when reading and writing.

Figure 5:
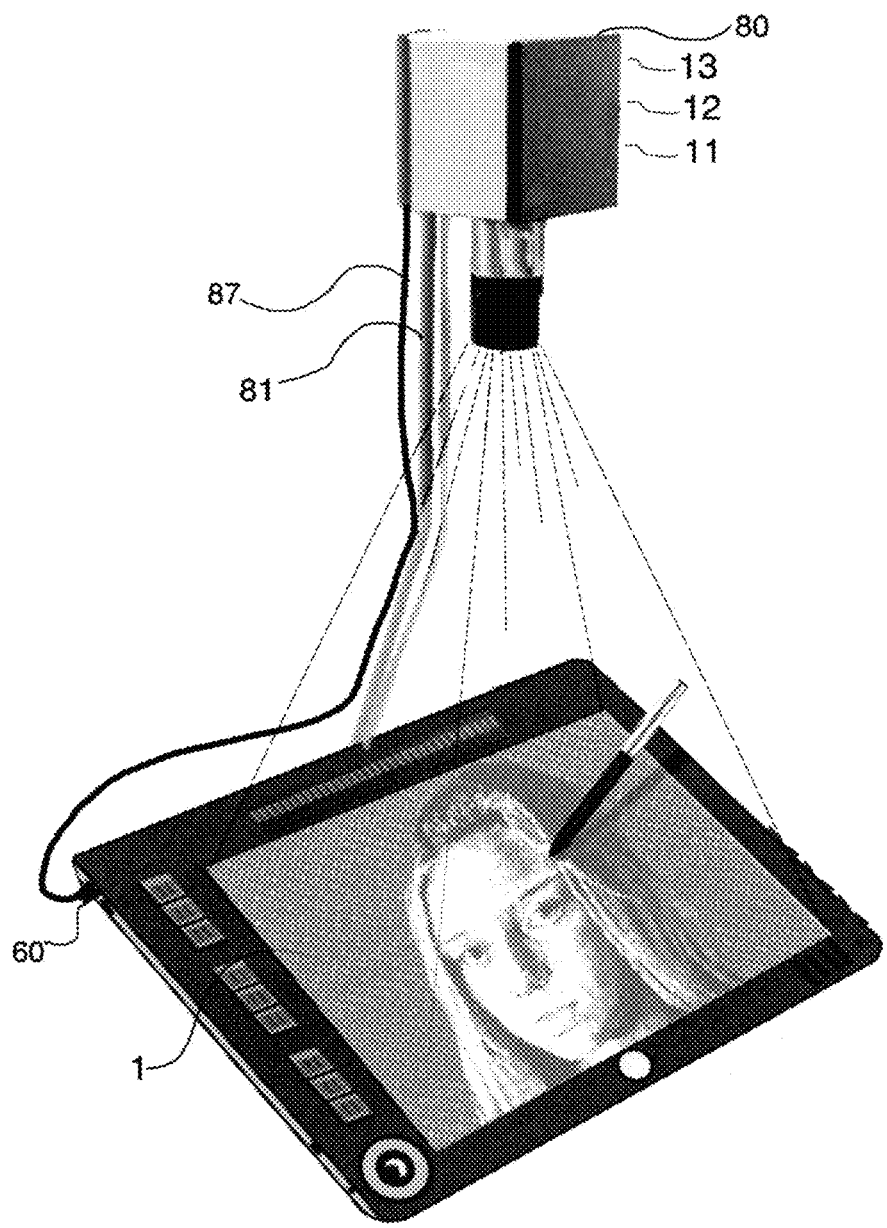
FIG. 5 is a view of this invention on a dock with an LCD WXGA Projector on a stand.

FIG. 5 shows a representative view of this invention on a dock with a LCD WXGA or other type of Projector (with assumed power source) 80 on a stand, 81. The tactile display, 1, is enhanced by a full color representation of the same image that being conveyed by the relative heights of the array of pins. The image is projected on the display by an LCD WXGA Projector, 80, positioned above this invention. If the image is changed or manipulated by the user, both the tactile display and the overhead projector will be synced to display the changes in real time. Like the Switches pictured in FIG. 1, a brightness control switch 11, a contrast control switch 12 and a color saturation control switch 13 would in this case be incorporated into the projector as pictured. 87 indicates a cord to allow for communication between the projector 80 and the device via a USB port 60.

Figure 6:
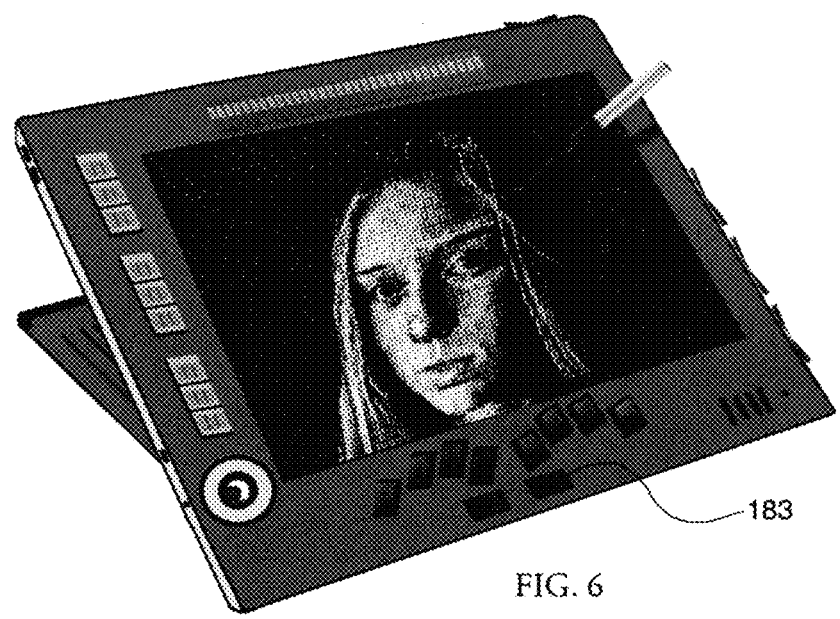
FIG. 6 is a view of this invention with an integrated braille keyboard.

FIG. 6 is a view of this invention with an integrated braille keyboard 188. Braille keyboards are integrated into most current electronic devices for the blind and visually impaired. This may increase the usefulness of the invention for use as a writing tablet and for use on the Internet.

Figure 7:
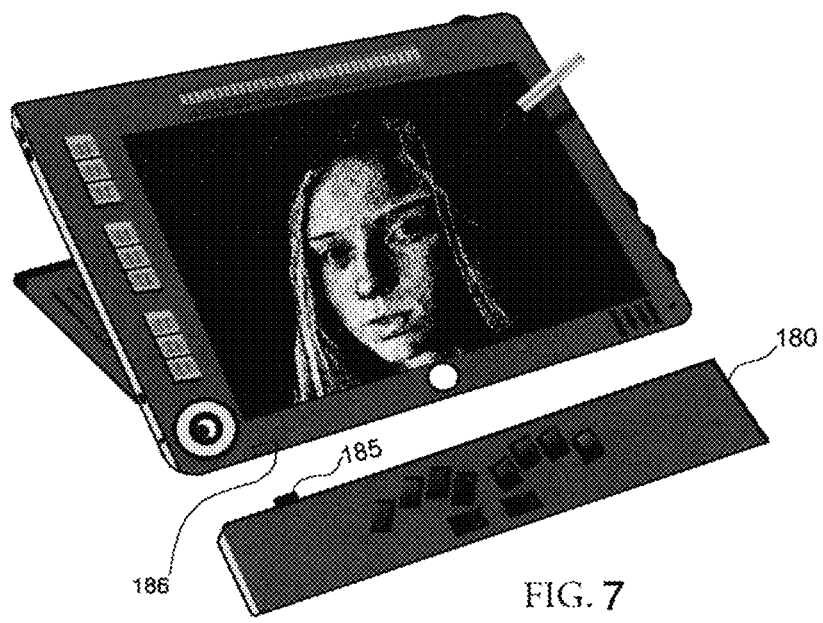
FIG. 7 is a view of this invention with a detachable braille keyboard.

FIG. 7 is a view of this invention with a detachable braille keyboard 180. 185 is the USB connection to the device in port 186 or another means of connecting this invention to the keyboard 180 such as Bluetooth. As mentioned above this may increase the usefulness of the invention for use as a writing tablet and for use on the Internet. However, a detachable keyboard 180 may add to portability and versatility of the device.

Figure 8:
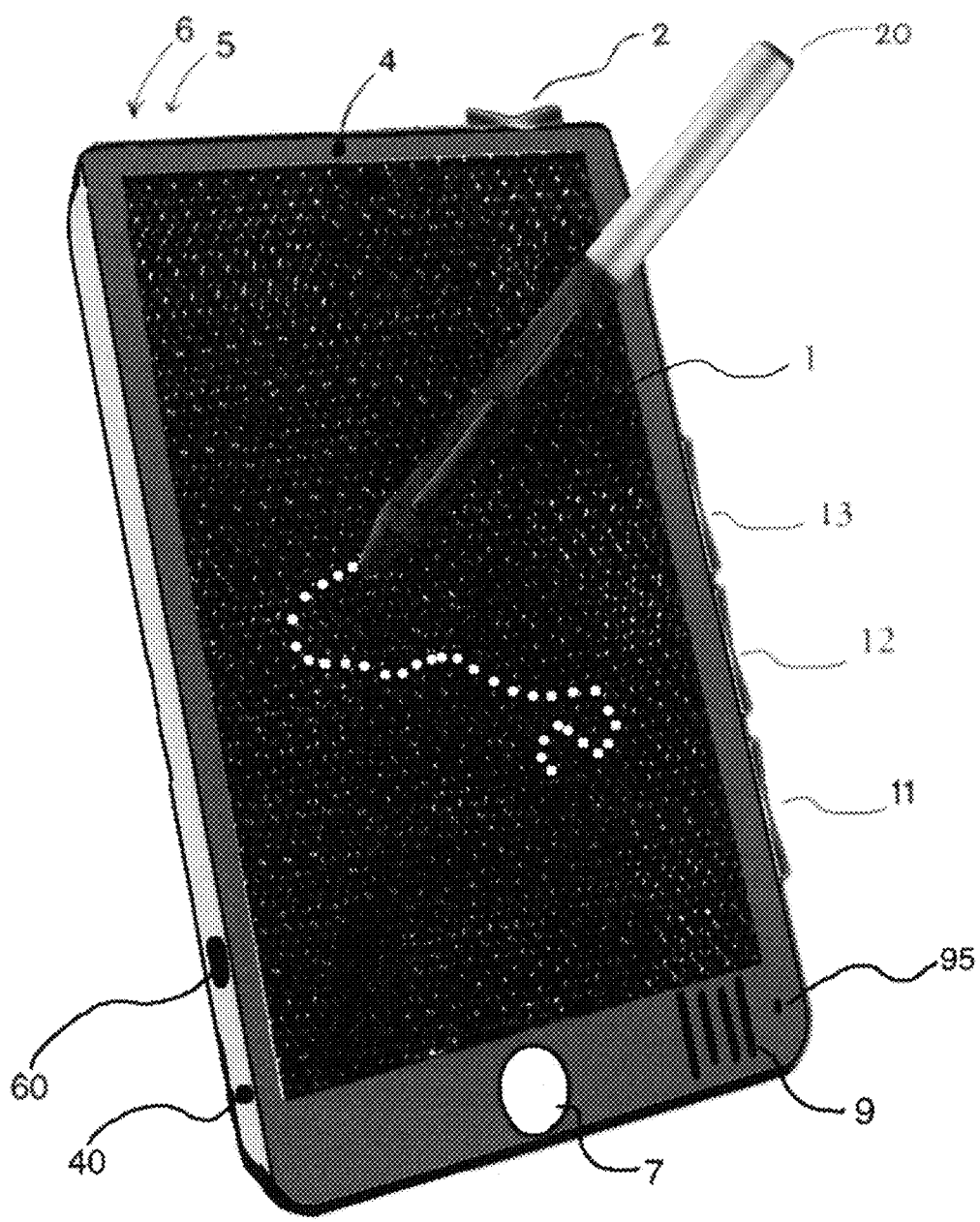
FIG. 8 is a view of this invention as a smaller, more portable version of the device.

FIG. 8 is a representation of the device as a smaller, more portable version. This invention may be made into a variety of different sizes to suit different needs. In this version, the device may be small enough to hold in one hand. Encompassing many of the features of explained in FIG. 1 including: 1 a refreshing, interactive (multi-touch) tactile display created with hundreds of self-adjusting pins encompassing features to use also as an enhanced visual color display. 20 is an illustration of an active stylus that is paired with this invention, 2 switches to control volume of speaker 9, 11 switches or controller for brightness, 12 switches or controller for contrast, 13 switches or controller for color saturation, 4 a front facing camera and 5 indicating a place for a rear facing camera and 6 an LED flash and light not pictured, 40 a Headphone jack, 60 indicates a charging/fire wire port, 95 indicates a Microphone, and 7 a power and home button.

Figure 9:
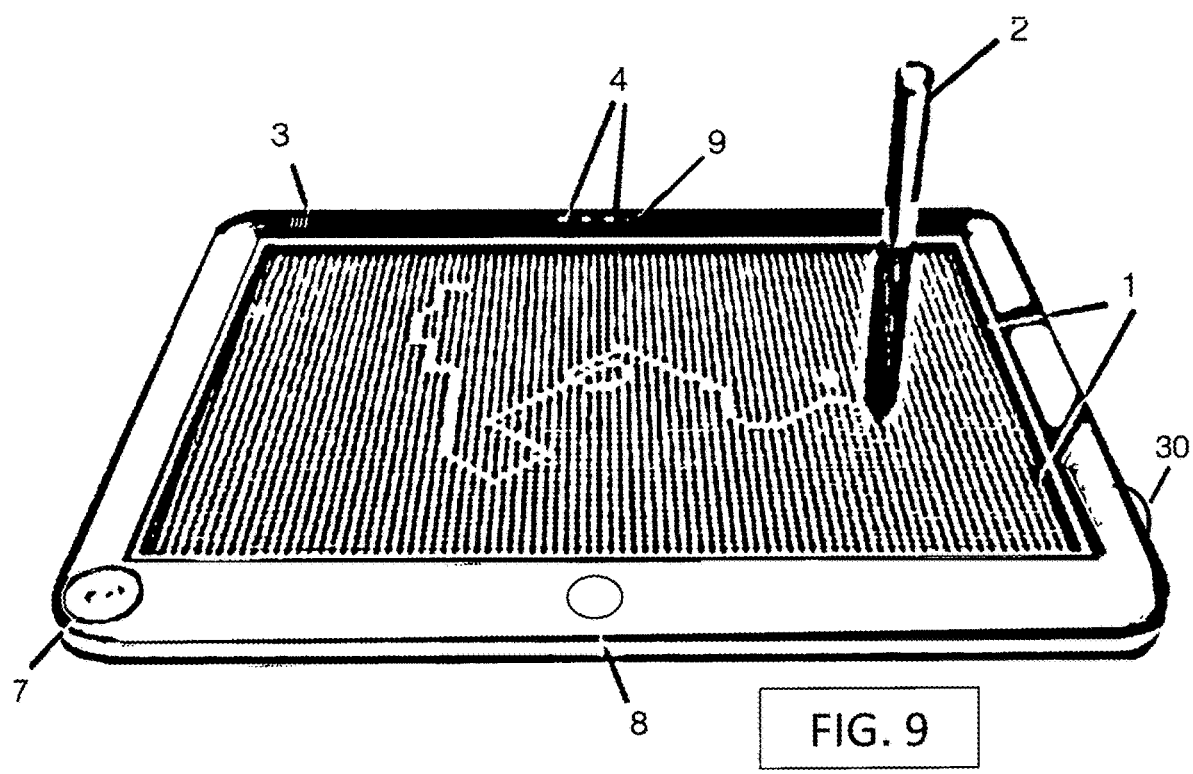
FIG. 9 is a view of the device as an educational tool and a toy

FIG. 9 is the apparatus without braille and the utilization of the same technology in a device illustrated in FIG. 1 and FIG. 2 to be used by a sighted person, comparable to an electronic 'Lite Brite' or a multi-sensory teaching tool. Pictured above is an illustration of an apparatus with a tactile and visual display 1, an active stylus that is paired with this invention 2, a controller and selecting device 7, a means to control volume 30 of speakers 3, a Microphone 9, a power and home button 8 and a multi-lens 3D camera 4.

Not pictured, like illustrated FIG. 2, is a controller for brightness 19, a controller for contrast 20, and a controller for color saturation, a rear-facing camera 17, LED flash and light 16, a Headphone jack 13, a charging/fire wire port 12, a SIM and memory card tray 11, USB ports 10, a stylus storage and charging port 14 are features that may be included in the apparatus.

As a toy for all ages, the apparatus would be similar to the extremely popular toy "Lite Brite" but a much more complex and with electronic capabilities. The smaller pins and the stylus 2 would allow the user to draw more detailed drawing. The operating system of the portable computer would be similar to that of a common computer Tablet. Learning-disabled students learn to read and write best with multi-sensory feedback. People with autism or other disabilities may also find the device motivational and helpful. A multi-sensory experience is a preferred intervention method. Thus, the tactile and color visual display 1, along with auditory feedback provided by either the speaker 3 or through the headphone jack 40. Students could write with the stylus 2 and feel and hear the letter or word they are writing. Students could also experience reading of letters or words or stories in a multisensory way.

FIG. 10 shows an example of a construction of a hardware system; a generic projector 50, optical receiver and optical fiber bundles that create a display screen 40 This may be used to construct a tactile display according to the present invention.

The genetic projector 50 transmits light, pictures and images through the projector lens 51. The projector 50 may take advantage of advances in the area of high-definition projectors that are increasing in quality and decreasing in size for more compact and portable use.

The image is projected onto aperture optical receiver 41 carried and expanded by optical fiber "bundles" or "cables" 42 to a display 40. Display 40 may be pressure sensitive to receive inputs from the user.

FIG. 11 is close-up view of the display and how an array optical fibers 43 may be combined with an array linear motors 30. The array of columns (Pins) 43 represent a simplified view of a pixel-like display constructed of optical fiber "bundles" or "cables" 43 either with cores of glass or plastic. The preference being for optical fibers would be OPF (optical plastic fiber) for its characteristics of being more durable, flexible and inexpensive.

FIG. 12 is a view of the cable structure of a single optical cable with display tip and the rectangular prism 30 representing a device for causing linear movement. This small device is that of a linear actuator or other such motor that causes linear movement like a cam and gear assembly, rack and pinion system, or a screwing motion. Any such means of causing linear motion could be enhanced with the addition of the fiber optics at its core. The moving part 31 of the motor/actuator 30 is attached to the fiber optic cable 43 to cause it to move up and down in a vertical fashion. The bundle of wires 32 is representative of how the motor will communicate with a computer and receive its power to operate.

The optical fiber cable 43 shown being attached to the motor/actuator 30 and broken down to its parts; the outer jacket 46, the inner jacket and cladding 45 and the optical fiber itself 44.

A transparent or translucent plastic cover 47 surrounds the optic fiber. Ideally, this plastic cap will enhance the light from the optic fiber and, together with hundreds of others, form a bright, colorful, touchable image. Covers 47 may also be constructed with fiber optics to enhance or aim the light in a particular direction.

Pins may also be pressure sensitive as to receive inputs from the user.

Figure 13:
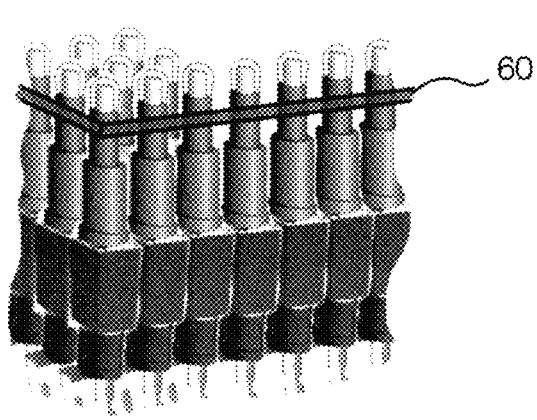
FIG. 13 is a view of the actuators (motors) and pins and how they may form an array.

FIG. 13 is a view of the actuators and pins and how they may form an array. They may be raised and lowered through a display surface 60 at varying heights.

Figure 14:
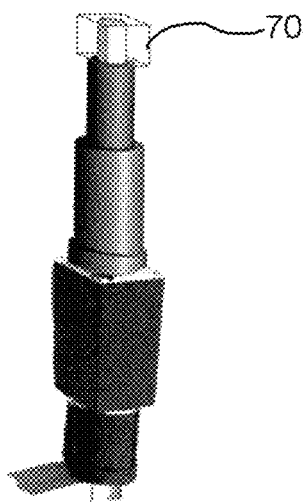
FIG. 14 is a view of the cable structure of a single optical cable with square/cube display tip.

FIG. 14 is a view of an individual pin with a square/cubed plastic cover 70 to form square pixels in an array. This feature may allow the user to make "Pixel Art" on a tactile display.

The invention claimed is:

1. A device for displaying an image on a tactile display, comprising:
   an array of pins that can be individually raised and lowered, wherein the relative heights of the pins convey a graphic image when touched; and
   multi-color, interactive, light generating technology that generates an illuminated image that is correlated with the graphic image.

2. The device as recited in claim 1, further comprising:
   haptics technology that provides haptic feedback to a user.

3. The device as recited in claim 1, further comprising:
   a storage device for saving images.

4. The device as recited in claim 1, wherein the pins may move to a variety of heights.

5. The device as recited in claim 1, further comprising:
   a paired, active stylus to manipulate the pins.

6. The device as recited in claim 5, wherein the pins raise and lower variably in response to a user pressing one or more buttons on the stylus.

7. The device as recited in claim 1, further comprising:
   an operating system.

8. The device as recited in claim 1, wherein each pin has a physical attribute comprising of materials that transmit light.

9. The device as recited in claim 1, wherein a projector is linked to the device that creates an image that overlays the pins.

10. The device as recited in claim 1, wherein the multi-color light generating technology comprises:
    an optical fiber system.

11. The device as recited in claim 1, wherein the multi-color light generating technology comprises:
    an aperture optical receiver.

12. The device as recited in claim 1, further comprising:
    piezoelectric actuators that raise and lower the pins.

13. The device as recited in claim 1, wherein the array of pins comprise:
    a plurality of illuminated pins.

14. The device as recited in claim 1, further comprising:
    controls that allow a user to easily adjust brightness, color and contrast.

15. The device as recited in claim 1, further comprising:
    network circuitry that can connect the device to a wireless network.

16. The device as recited in claim 1, further comprising:
    a braille keyboard.

17. The device as recited in claim 1, further comprising:
    technology that enables the device to be connected to a Wi Fi network.

18. The device as recited in claim 1, further comprising:
    circuitry for communicating via Bluetooth.

19. The device as recited in claim 1, further comprising: circuitry for communicating with a detachable braille keyboard.

20. The device as recited in claim 1, further comprising: a front-facing multi-lens 3D camera.

21. The device as recited in claim 1, further comprising: a rear-facing camera.

22. The device as recited in claim 21, wherein the rear-facing camera is a multi-lens 3D camera.

23. The device as recited in claim 1, further comprising: a sensor for auto focus.

24. The device as recited in claim 1, further comprising: a camera, wherein images captured by the camera are digitized and utilized to create a corresponding tactile image.

25. The device as recited in claim 1, further comprising: a camera that comprises at least one edge- detecting filter to detect contours of objects that enable the device to simplify and display a tactile image.

26. The device as recited in claim 1, further comprising: technology that can display multiple lines of braille.

27. The device as recited in claim 1, wherein a subset of the array of pins forms a touch sensitive braille keyboard.

28. The device as recited in claim 1, further comprising: GPS technology.

29. The device as recited in claim 1, further comprising: an embedded line of refreshing braille cells.

30. The device as recited in claim 1, further comprising: piezoelectric actuators that are operable to move each pin in a linear way.

31. The device as recited in claim 1, further comprising: a motor that causes linear movement of each of said pins.

32. The device as recited in claim 1, further comprising: optical plastic fiber that is operable to transfer light.

33. The device as recited in claim 1, further comprising: a microphone; and
speakers.

34. The device as recited in claim 33, further comprising: voice-recognition software operable to enable at least one of voice controls, voice to text, and voice to braille capability.

35. The device as recited in claim 33, further comprising: voice-recognition software.

36. The device as recited in claim 1, further comprising: at least one button that comprises refreshing braille cells indicative of different functions of the device.

* * * * *